(12) United States Patent
Hashimoto et al.

(10) Patent No.: US 12,403,781 B2
(45) Date of Patent: Sep. 2, 2025

(54) VEHICLE AND CHARGING SYSTEM

(71) Applicant: TOYOTA JIDOSHA KABUSHIKI KAISHA, Toyota (JP)

(72) Inventors: Toshiya Hashimoto, Miyoshi (JP); Kazuhisa Matsuda, Sunto-gun (JP); Fumihiko Nakamura, Susono (JP); Manabu Handa, Susono (JP); Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 672 days.

(21) Appl. No.: 17/806,404

(22) Filed: Jun. 10, 2022

(65) Prior Publication Data

US 2022/0402378 A1 Dec. 22, 2022

(30) Foreign Application Priority Data

Jun. 21, 2021 (JP) ................................. 2021-102301

(51) Int. Cl.
*B60L 53/12* (2019.01)
*H02J 7/34* (2006.01)
*H02J 50/10* (2016.01)
*H02J 50/40* (2016.01)

(52) U.S. Cl.
CPC ............. *B60L 53/12* (2019.02); *H02J 7/342* (2020.01); *H02J 50/10* (2016.02); *H02J 50/40* (2016.02)

(58) Field of Classification Search
CPC ...................................... H02J 7/342
USPC ................................................. 320/108, 103
See application file for complete search history.

(56) References Cited

U.S. PATENT DOCUMENTS

| 9,744,870 | B2 * | 8/2017 | Cronie | .............. H02J 50/90 |
| 2021/0399591 | A1 * | 12/2021 | Kim | .............. H04L 27/02 |
| 2022/0016987 | A1 * | 1/2022 | Döner | .............. B60L 53/54 |

FOREIGN PATENT DOCUMENTS

| CN | 112638701 A | | 4/2021 |
| JP | 2013038991 A | * | 2/2013 |
| JP | 2017-143628 A | | 8/2017 |

* cited by examiner

*Primary Examiner* — Edward Tso
*Assistant Examiner* — Ahmed H Omar
(74) *Attorney, Agent, or Firm* — Finnegan, Henderson, Farabow, Garrett and Dunner, LLP

(57) ABSTRACT

A vehicle includes: a controller; a power receiving device that contactlessly receives power from a power transmitting facility; a battery chargeable using the power received by the power receiving device; and a power transmitting device that contactlessly outputs, to another vehicle, the power received by the power receiving device. The other vehicle contactlessly receives power from each of the power transmitting facility and the power transmitting device. When the other vehicle is unable to contactlessly receive the power from the power transmitting facility, the controller controls the power transmitting device to contactlessly output the power received by the power receiving device to the other vehicle in accordance with a request from the other vehicle.

6 Claims, 6 Drawing Sheets

VEHICLE AND CHARGING SYSTEM

This nonprovisional application is based on Japanese Patent Application No. 2021-102301 filed on Jun. 21, 2021, with the Japan Patent Office, the entire contents of which are hereby incorporated by reference.

BACKGROUND

Field

The present disclosure relates to a vehicle and a charging system, more particularly, a vehicle that contactlessly receives power and a charging system that contactlessly charges the vehicle with power.

Description of the Background Art

Japanese Patent Laying-Open No 2017-143628 discloses a power transmitting system for contactlessly transmitting power, to a vehicle stopped at an intersection to wait for traffic light, from a power transmitting facility provided at the intersection.

SUMMARY

According to the power transmitting system disclosed in Japanese Patent Laying-Open No. 2017-143628, the battery of the vehicle can be charged using the power received contactlessly from the power transmitting facility provided at the intersection while the vehicle is stopped at the intersection to wait for traffic light. However, for example, when a large number of other vehicles are stopped to wait for traffic light, the foregoing vehicle may be unable to be stopped at a position at which power from the power transmitting facility can be received contactlessly, with the result that the battery may be unable to be charged using the power from the power transmitting facility.

The present disclosure has been made to solve the above-described problem, and has an object to provide a technique of charging a battery of a vehicle using power from a power transmitting facility even when the vehicle cannot contactlessly receive the power from the power transmitting facility.

A vehicle according to an aspect of the present disclosure is a vehicle that contactlessly receives power, and includes a controller, a power receiving device, a battery, and a power transmitting device. The power receiving device contactlessly receives power from a power transmitting facility. The battery is chargeable using the power received by the power receiving device. The power transmitting device contactlessly outputs, to another vehicle, the power received by the power receiving device. The other vehicle contactlessly receives power from each of the power transmitting facility and the power transmitting device. When the other vehicle is unable to contactlessly receive the power from the power transmitting facility, the controller controls the power transmitting device to contactlessly output the power received by the power receiving device to the other vehicle in accordance with a request from the other vehicle.

A charging system according to an aspect of the present disclosure includes a first vehicle, a second vehicle, and a power transmitting facility. The power transmitting facility contactlessly transmits power to each of the first vehicle and the second vehicle. When the power from the power transmitting facility is unable to be contactlessly received, the first vehicle requests the second vehicle to output the power. When the power from the power transmitting facility is able to contactlessly received, the second vehicle contactlessly outputs, to the first vehicle, the power received from the power transmitting facility in accordance with the request from the first vehicle.

In the above configuration, when the other vehicle cannot contactlessly receive power from the power transmitting facility, the vehicle that can contactlessly receive power from the power transmitting facility outputs, to the other vehicle, the power received from the power transmitting facility in accordance with the request from the other vehicle. Thus, even when the vehicle cannot contactlessly receive the power from the power transmitting facility, the battery of the vehicle can be charged using the power from the power transmitting facility, thereby improving the user's convenience.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
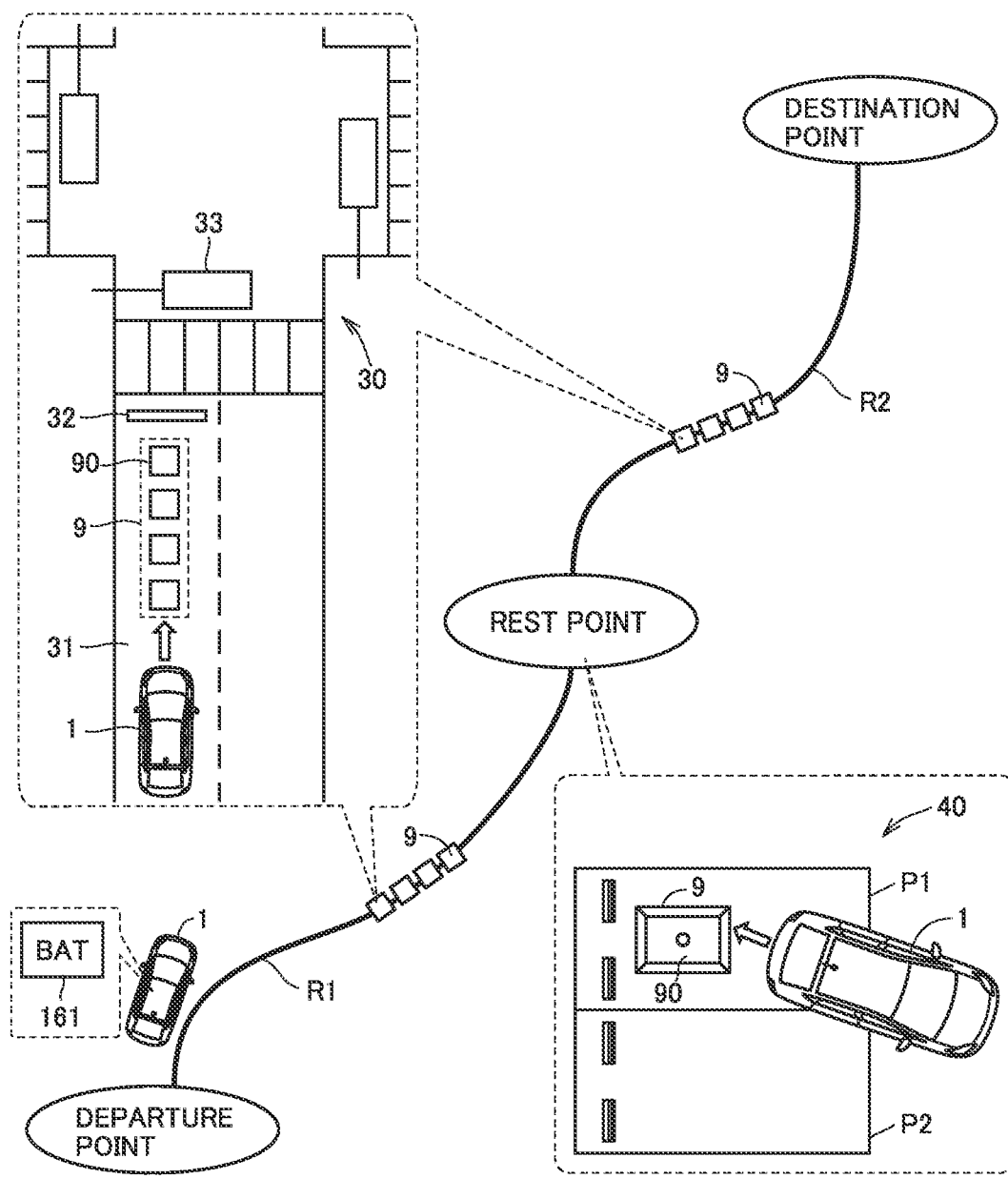
FIG. 1 is a diagram showing exemplary charging points in a traveling route for a vehicle according to an embodiment.

Hereinafter, embodiments of the present disclosure will be described in detail with reference to figures. It should be noted that in the figures, the same or corresponding portions are denoted by the same reference characters, and will not be described repeatedly.

<Exemplary Charging Points in Traveling Route for Vehicle>

FIG. 1 is a diagram showing exemplary charging points in a traveling route for a vehicle 1 according to an embodiment. FIG. 1 shows an example in which vehicle 1 travels from a departure point to a destination point via a rest point.

Vehicle 1 is an electrically powered vehicle having a battery 161 thereon for traveling, and is, for example, a battery electric vehicle (BEV) or a plug-in hybrid electric vehicle (PHEV). As shown in FIG. 1, an intersection 30 is provided in each of a traveling route R1 for vehicle 1 between the departure point and the rest point and a traveling route R2 for vehicle 1 between the rest point and the destination point. Intersection 30 is provided with a stop line 32 and a traffic light 33 for a traveling lane 31 leading to intersection 30.

In traveling lane 31, a power transmitting facility 9 is provided to precede stop line 32. Power transmitting facility 9 includes one or more power transmitting units 90. In this example, power transmitting facility 9 including four power transmitting units 90 is provided in traveling lane 31. It should be noted that power transmitting facility 9 may be provided in the ground of traveling lane 31 or may be provided on a side wall of traveling lane 31.

Power transmitting facility 9 employs each of power transmitting units 90 to contactlessly transmit power to vehicle 1 stopped at intersection 30 to wait for traffic light. Thus, battery 161 of vehicle 1 can be charged using the power contactlessly received from power transmitting facility 9 while vehicle 1 is stopped at intersection 30 to wait for traffic light.

A parking lot 40 is provided at the rest point such as a service area. Parking lot 40 includes: a parking space P1 provided with power transmitting facility 9; and a parking space P2 provided with no power transmitting facility 9. In this example, power transmitting facility 9 including one power transmitting unit 90 is provided in parking space P1. It should be noted that power transmitting facility 9 including a plurality of power transmitting units 90 may be provided in parking space P1. Further, power transmitting facility 9 may be provided in the ground of parking space P1 or may be provided on a side wall of parking space P1.

Power transmitting facility 9 employs power transmitting unit 90 to contactlessly transmit power to vehicle 1 parked in parking space P1. Thus, while vehicle 1 is parked in parking space P1, battery 161 can be charged using the power contactlessly received from power transmitting facility 9.

Thus, vehicle 1 can travel from the departure point to the destination point via the rest point with battery 161 being charged at the charging points such as intersection 30 and parking lot 40 by using the power contactlessly received from power transmitting facilities 9. It should be noted that in the description below, the charging that is contactlessly performed using power transmitting facility 9 is also referred to as "contactless charging".

<Exemplary Configuration of Vehicle>

Figure 2:
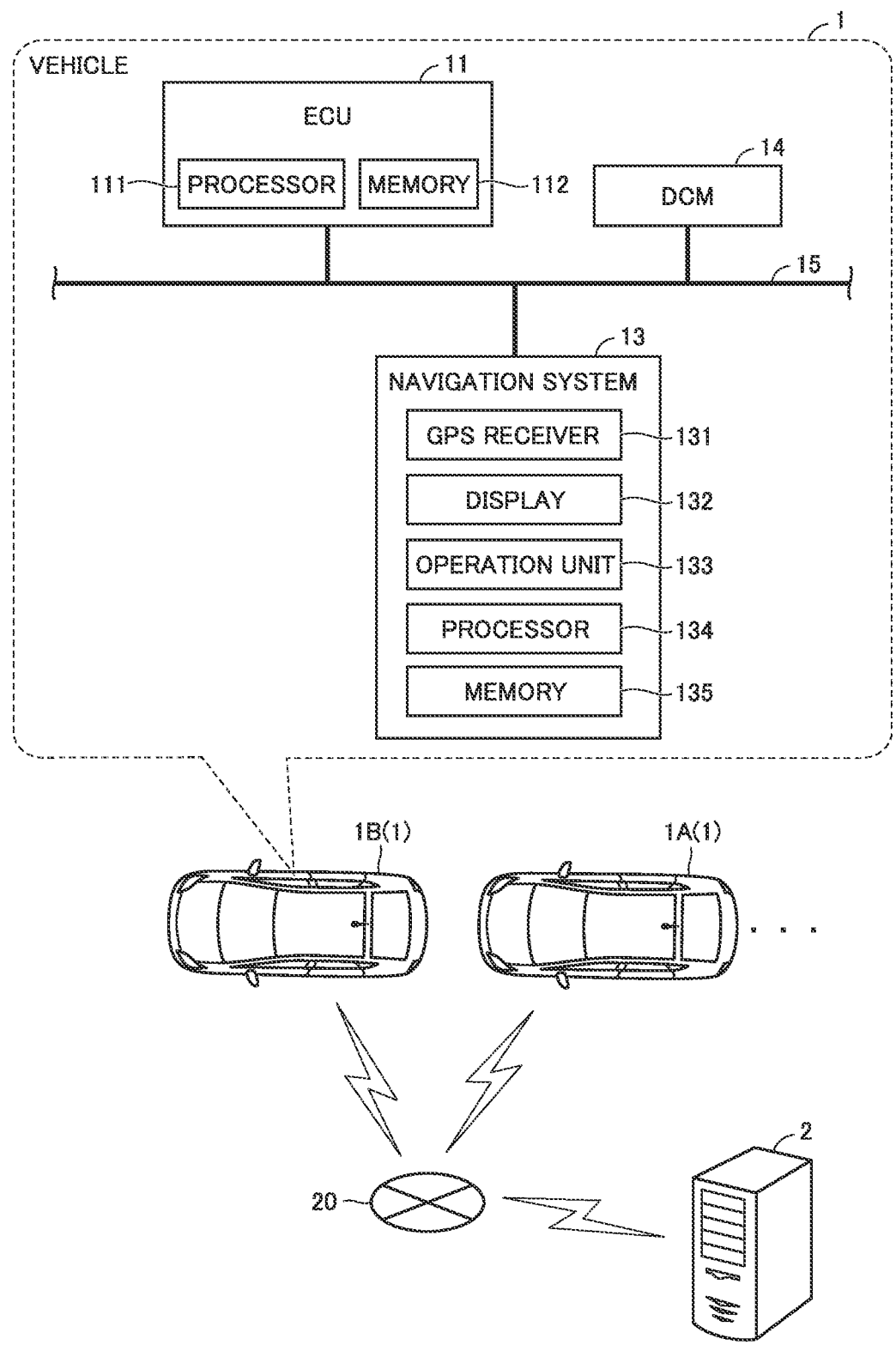
FIG. 2 is a diagram showing an exemplary configuration of the vehicle according to the embodiment.

FIG. 2 is a diagram showing an exemplary configuration of the vehicle according to the embodiment. It should be noted that FIG. 2 shows a plurality of vehicles 1A, 1B each serving as vehicle 1 but both vehicles 1 have a similar configuration.

As shown in FIG. 2, each of vehicles 1 includes an ECU (Electronic Control Unit) 11, a navigation system 13, and a communication module 14. ECU 11, navigation system 13, and communication module 14 can communicate with one another via an in-vehicle network 15 such as a CAN (Controller Area Network).

ECU 11 is an example of "controller" and includes: a processor such as a CPU (Central Processing Unit); and a memory 112 such as a ROM (Read Only Memory) and a RAM (Random Access Memory). Processor 111 is configured to perform a predetermined calculation process described in a program. Memory 112 stores a program to be executed by processor 111. Further, memory 112 temporarily stores data generated by execution of a program by processor 111 and data input via communication module 14. ECU 11 controls each device in vehicle 1 to bring vehicle 1 into a desired state based on a detected value of each of various types of sensors (not shown) and a program stored in memory 112. Further, ECU 11 generates various types of data to be exchanged with each of other vehicle 1 and a server 2 via a network 20.

Navigation system 13 guides the traveling route for vehicle 1. Navigation system 13 includes a GPS (Global Positioning System) receiver 131, a display 132, an operation unit 133, a processor 134, and a memory 135.

GPS receiver 131 specifies the location of vehicle 1 based on electric wave from an artificial satellite (not shown). Processor 134 performs various types of navigation processes (such as searching for a traveling route) based on the location information (GPS information) of vehicle 1 specified by GPS receiver 131.

Display 132 displays images (for example, icons) indicating various information. For example, display 132 displays an image indicating that contactless charging is being performed when vehicle 1 is being contactlessly charged, and displays an image indicating that contactless charging is not being performed when vehicle 1 is not being contactlessly charged.

Operation unit 133 is constituted of a touch panel or the like, and receives various operations of a user (for example, a driver). For example, operation unit 133 receives an operation by the user to select a traveling route for vehicle 1.

Communication module 14 is an in-vehicle DCM (Data Communication Module), and is configured to allow for bidirectional communication between ECU 11 and each of other vehicle 1 and server 2 via network 20.

Server 2 manages the plurality of vehicles 1. Further, server 2 holds the latest road information and holds the latest information regarding power transmitting facilities 9. For example, server 2 collects the location information (GPS information) of each of the plurality of vehicles 1 and information on an amount of power (hereinafter, also referred to as "SOC" (State Of Charge)) stored in battery 161. These pieces of information are periodically transmitted from each vehicle 1 to server 2. Server 2 stores the collected information into a vehicle information database. Server 2 stores information on specifications (for example, charging method and charging capability), installation locations, and the like of power transmitting facilities 9. Further, server 2 may acquire, from a controller (not shown) of traffic light 33, information by which the time of waiting for traffic light 33 provided at intersection 30 can be specified.

<Configuration Regarding Contactless Charging>

Figure 3:
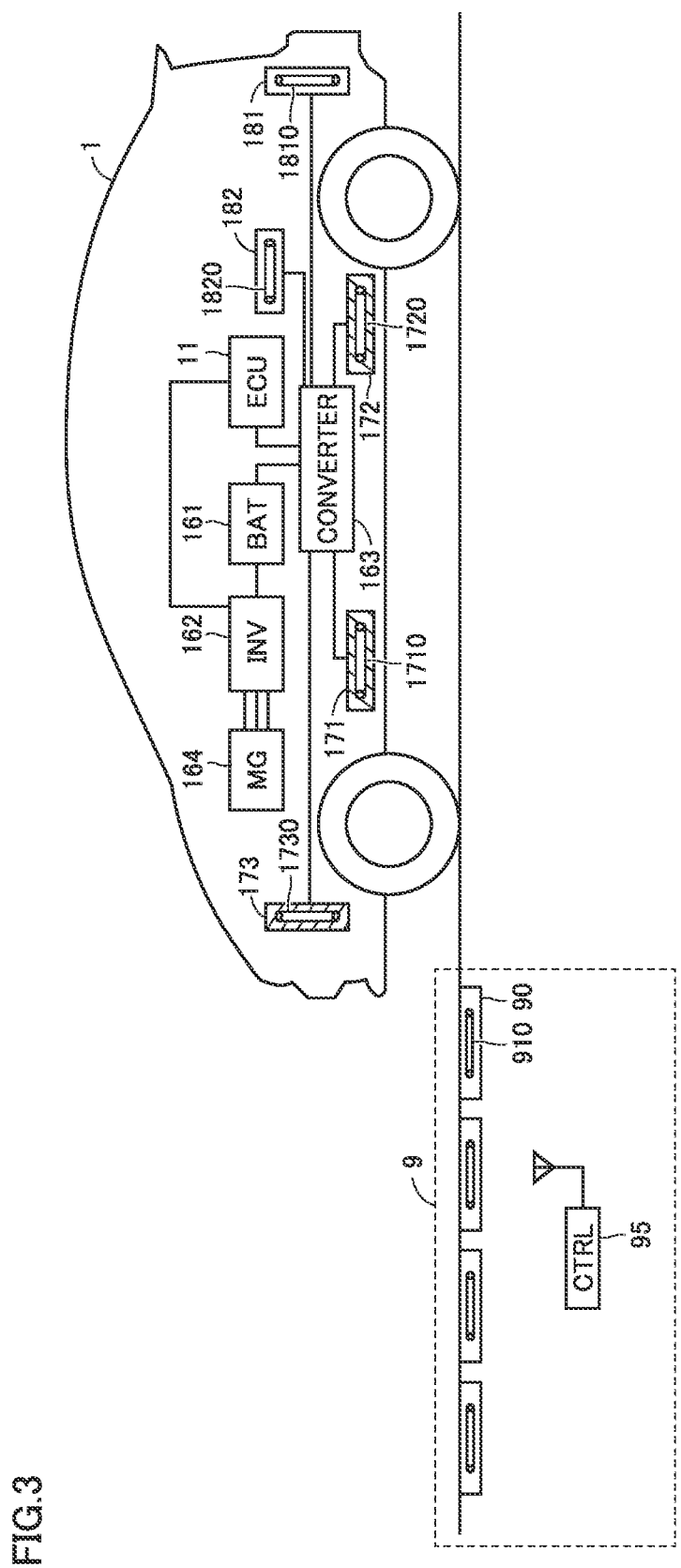
FIG. 3 is a diagram showing an exemplary configuration of each of the vehicle and a power transmitting facility according to the embodiment.

FIG. 3 is a diagram showing exemplary configurations of vehicle 1 and power transmitting facility 9 according to the embodiment. In addition to the configuration shown in FIG. 2, vehicle 1 further includes battery 161, an inverter 162, a converter 163, a motor generator 164, power receiving devices 171 to 173, and power transmitting devices 181, 182.

Battery 161 is a battery pack including a plurality of cells. Each of the cells is a secondary battery such as a lithium ion battery or a nickel-metal hydride battery. Battery 161 supplies, to motor generator 164 via inverter 162, power for generating driving force of vehicle 1. Further, battery 161 stores power generated by motor generator 164. Battery 161 is provided with a voltage sensor and a current sensor (both not shown) to allow ECU 11 to calculate the SOC of battery 161.

Inverter 162 converts DC power stored in battery 161 into AC power in accordance with control of ECU 11, and supplies the AC power to motor generator 164. Further, inverter 162 converts AC power (regenerative power) from motor generator 164 into DC power in accordance with control of ECU 11, and charges battery 161 with the DC power.

Converter 163 converts AC power received by each of power receiving devices 171 to 173 into DC power in accordance with control of ECU 11, and charges battery 161 with the DC power. Converter 163 converts the DC power stored in battery 161 into AC power in accordance with control of ECU 11, and outputs the AC power from each of power transmitting devices 181, 182 to other vehicle 1.

Motor generator 164 receives power from inverter 162 and applies rotational force to the driving wheels, thereby causing vehicle 1 to travel.

Power receiving device 171 is disposed, for example, at a lower portion of vehicle 1. Power receiving device 171 includes a power receiving coil 1710, and employs power receiving coil 1710 to contactlessly receive power output from power transmitting facility 9 provided in each of traveling lane 31 of intersection 30 and parking space P1 of parking lot 40.

Power receiving device 172 is disposed, for example, at a side surface portion of vehicle 1. Power receiving device 172 includes a power receiving coil 1720, and employs power receiving coil 1720 to contactlessly receive power output from other vehicle 1 stopped beside the side surface of vehicle 1.

Power receiving device 173 is disposed, for example, at a front portion of vehicle 1. Power receiving device 173 includes a power receiving coil 1730, and employs power receiving coil 1730 to contactlessly receive power output from other vehicle 1 stopped in front of vehicle 1.

It should be noted that power receiving devices 171 to 173 may be integrated into one power receiving device. That is, vehicle 1 may employ one power receiving device to contactlessly receive the power output from power transmitting facility 9 or to contactlessly receive the power output from other vehicle 1 stopped beside the side surface of vehicle 1 or stopped in front of vehicle 1.

Power transmitting device 181 is disposed, for example, at a rear portion of vehicle 1. Power transmitting device 181 includes a power transmitting coil 1810, and employs power transmitting coil 1810 to contactlessly output power to other vehicle 1 stopped behind vehicle 1. It should be noted that power transmitting device 181 is an example of "power transmitting device"; however, a device in which converter 163 and power transmitting device 181 are integrally formed may be the example of "power transmitting device".

Power transmitting device 182 is disposed, for example, at the side surface portion of vehicle 1. Power transmitting device 182 includes a power transmitting coil 1820, and employs power transmitting coil 1820 to contactlessly output power to other vehicle 1 stopped beside the side surface of vehicle 1. It should be noted that power transmitting device 182 is an example of "power transmitting device"; however, a device in which converter 163 and power transmitting device 182 are integrally formed may be the example of "power transmitting device".

It should be noted that power transmitting devices 181, 182 may be integrated into one power transmitting device. That is, vehicle 1 may employ one power transmitting device to contactlessly output power to other vehicle 1 stopped behind vehicle 1 or beside the side surface of vehicle 1.

Power transmitting facility 9 includes one or more power transmitting units 90 and a controller 95. FIG. 3 shows an example in which power transmitting facility 9 includes four power transmitting units 90. For example, as shown in FIG. 1, four power transmitting units 90 are disposed in a row in traveling lane 31 of intersection 30. It should be noted that as shown in FIG. 1, one power transmitting unit 90 may be disposed in parking space P1 of parking lot 40.

Each of power transmitting units 90 includes a power transmitting coil 910. Power transmitting coil 910 is electrically connected to an AC power supply (not shown). Further, power transmitting unit 90 is provided with a sensor (an optical sensor, a weight sensor, or the like) (not shown) for detecting vehicle 1 (or power receiving device 171) located within a range in which contactless charging can be performed.

Controller 95 specifies the location of vehicle 1 (or power receiving device 171) based on a detection signal from each of the sensors described above. Then, controller 95 supplies AC power from the AC power supply, to power transmitting coil 910 of power transmitting unit 90 located within the range in which contactless charging to vehicle 1 can be performed.

For example, when controller 95 detects that vehicle 1 is present above power transmitting unit 90 in traveling lane 31 or parking space P1, controller 95 supplies AC power to power transmitting coil 910. Thus, alternating current flows through power transmitting coil 910, with the result that an electromagnetic field is formed around power transmitting coil 910. Power receiving coil 1710 in power receiving device 171 of vehicle 1 contactlessly receives the power through the electromagnetic field formed around power transmitting coil 910. Thereafter, when vehicle 1 is no longer detected to be present above power transmitting unit 90 in traveling lane 31 or parking space P1, controller 95 stops supplying the AC power to power transmitting coil 910. By performing such a series of control in one or each of the plurality of power transmitting units 90, power transmitting facility 9 can contactlessly transmit power to vehicle 1.

<Contactless Charging Between Vehicles at Intersection>

As described above, vehicle 1 is configured to contactlessly receive power from power transmitting facility 9 provided at intersection 30. That is, when vehicle 1 can be stopped at a position at which power from power transmitting facility 9 can be contactlessly received while waiting for traffic light at intersection 30, contactless charging from power transmitting facility 9 can be performed. However, for example, when a large number of other vehicles 1 are stopped to wait for traffic light, vehicle 1 may be unable to be stopped at the position at which the power from power transmitting facility 9 can be received contactlessly, with the result that battery 161 may be unable to be charged using the power from power transmitting facility 9.

Thus, vehicle 1 according to the embodiment is configured such that battery 161 can be charged using the power from power transmitting facility 9 through contactless charging from other vehicle 1 even when the power from power transmitting facility 9 cannot be received contactlessly. Hereinafter, a first charging system 101 according to the embodiment will be described.

Figure 4:
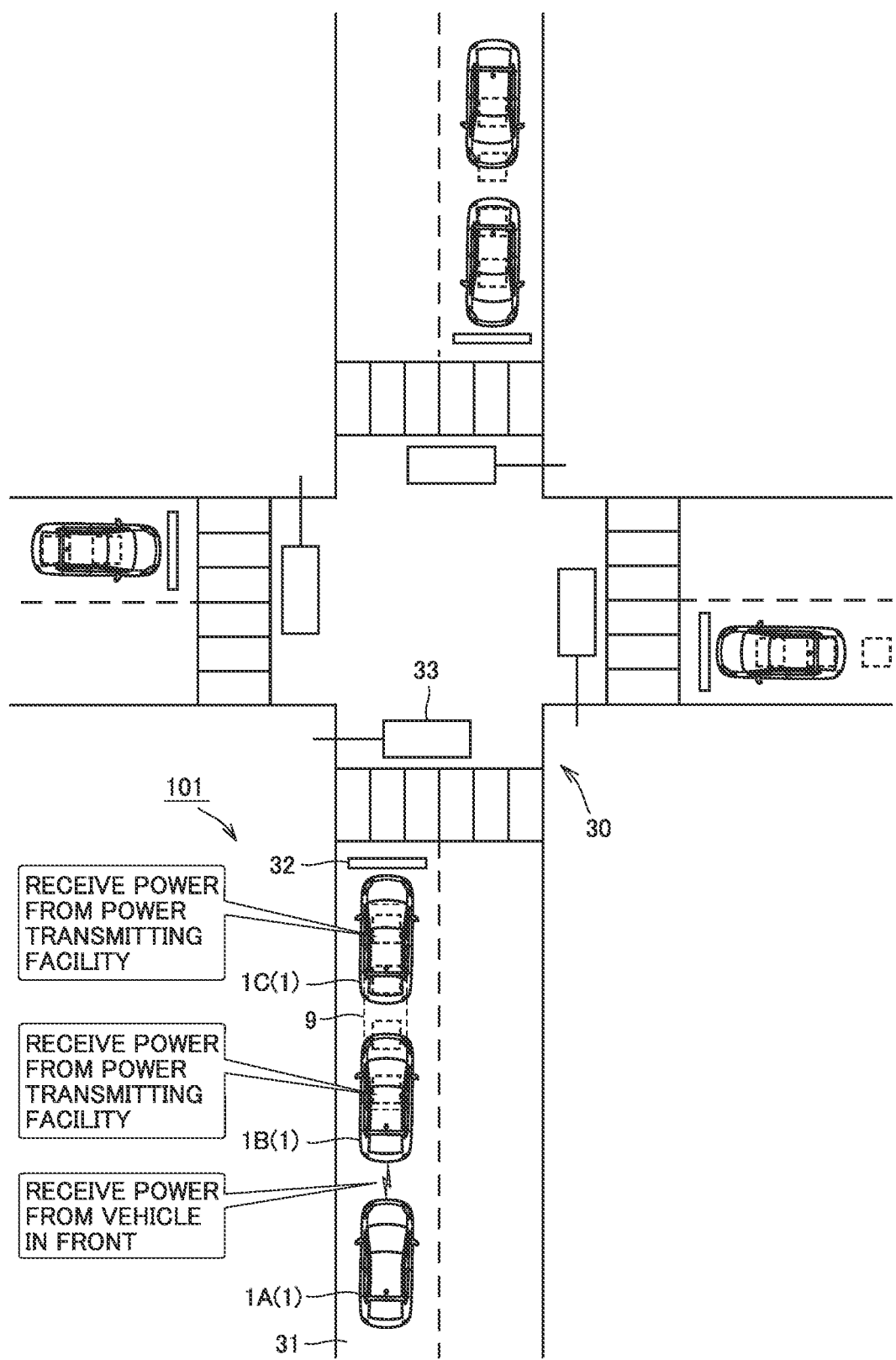
FIG. 4 is a diagram showing an exemplary first charging system according to the embodiment.

FIG. 4 is a diagram showing an exemplary first charging system 101 according to the embodiment. First charging system 101 includes a vehicle 1A, a vehicle 1B, and a power transmitting facility 9 provided at intersection 30 and configured to contactlessly transmit power to each of vehicle 1A and vehicle 1B. Vehicle 1A is an example of "first vehicle". Vehicle 1B is an example of "second vehicle".

In traveling lane 31 of intersection 30, the plurality of vehicles 1, i.e., vehicles 1A to 1C are stopped to wait for traffic light. Each of vehicle 1C located at the first place of the queue in waiting for traffic light and vehicle 1B located immediately after vehicle 1C is stopped at a position at which power from power transmitting facility 9 provided in traveling lane 31 can be received contactlessly. Thus, battery 161 of each of vehicle 1B and vehicle 1C can be charged using the power from power transmitting facility 9 while waiting for traffic light.

On the other hand, vehicle 1A located immediately after vehicle 1B is not stopped at a position at which power from power transmitting facility 9 provided in traveling lane 31 can be received contactlessly. Therefore, battery 161 of vehicle 1A cannot be charged using the power from power transmitting facility 9 while waiting for traffic light.

Therefore, when the power from power transmitting facility 9 cannot be received contactlessly, vehicle 1A requests vehicle 1B located in front of vehicle 1A to output the power. When the power from power transmitting facility 9 can be received contactlessly, vehicle 1B contactlessly outputs, to vehicle 1A, the power received from power transmitting facility 9 in accordance with the request from vehicle 1A.

Specifically, when ECU 11 of vehicle 1A determines that power receiving device 171 cannot receive the power from power transmitting facility 9, ECU 11 outputs a request signal for requesting vehicle 1B in front of vehicle 1A to transmit power in accordance with an instruction input by the user of vehicle 1A under conditions that a power transmission request condition is satisfied.

The power transmission request condition includes, for example, a condition that a distance between vehicle 1A and vehicle 1B is less than or equal to a distance in which power can be contactlessly transmitted from vehicle 1B to vehicle 1A. That is, the power transmission request condition includes a condition that the distance between vehicle 1A and vehicle 1B falls within a range in which contactless charging can be performed.

Upon receipt of the request signal from vehicle 1A, vehicle 1B outputs a permission signal for permitting to transmit power to vehicle 1A having made the request in accordance with an instruction input by the user of vehicle 1B under conditions that a power transmission permission condition is satisfied.

The power transmission permission condition includes, for example, a condition that vehicle 1B is contactlessly receiving power from power transmitting facility 9, and/or a condition that the SOC of vehicle 1B on the power transmitting side is larger than the SOC of vehicle 1A on the power receiving side. It should be noted that the power transmission permission condition may include a condition that the SOC of vehicle 1B on the power transmitting side has reached an upper limit value (for example, fully charged). Further, the power transmission permission condition may include a condition that the time of waiting for traffic light at intersection 30 is more than or equal to a threshold value. For example, vehicle 1B may acquire, from server 2, a signal by which the time of waiting for traffic light 33 provided at intersection 30 can be specified, and when the time of waiting for traffic light 33 is more than or equal to a time (threshold value) during which contactless charging from other vehicle 1A can be performed, vehicle 1B may output a permission signal for permitting to transmit power to vehicle 1A having made the request in accordance with an instruction input by the user of vehicle 1B.

When vehicle 1A receives the permission signal from vehicle 1B, vehicle 1A performs a power reception starting process for starting to contactlessly receive power from vehicle 1B. Thus, vehicle 1B contactlessly outputs, to vehicle 1A, the power received from power transmitting facility 9 provided at intersection 30. More specifically, ECU 11 of vehicle 1B indirectly controls power transmitting device 181 via converter 163 so as to contactlessly output, to vehicle 1A, the power received by power receiving device 171 from power transmitting facility 9.

On this occasion, battery 161 of vehicle 1B may be charged using the power received by power receiving device 171 from power transmitting facility 9, and the power stored in battery 161 may be contactlessly output to vehicle 1A. Alternatively, vehicle 1B may contactlessly output the power received by power receiving device 171 to vehicle 1A directly without charging battery 161 using the power received by power receiving device 171 from power transmitting facility 9. Further, vehicle 1B may output, to vehicle 1A, power corresponding to an amount of power contactlessly received from power transmitting facility 9 provided at intersection 30.

Thus, even when vehicle 1A cannot contactlessly receive the power from power transmitting facility 9 provided in traveling lane 31 of intersection 30, the power output from power transmitting device 181 provided at the rear portion of vehicle 1B can be received contactlessly by power receiving device 173, and battery 161 can be charged using the received power. Therefore, the user's convenience is improved.

<Contactless Charging Between Vehicles in Parking Lot>

As described above, vehicle 1 is configured to contactlessly receive the power of power transmitting facility 9 provided in parking lot 40. That is, when vehicle 1 can be parked in parking lot 40 at parking space P1 provided with power transmitting facility 9, contactless charging from power transmitting facility 9 can be performed. For example, however, when other vehicle 1 is already parked in parking space P1 provided with power transmitting facility 9, vehicle 1 cannot contactlessly receive power from power transmitting facility 9.

Thus, vehicle 1 according to the embodiment is configured such that battery 161 can be charged using the power from power transmitting facility 9 through contactless charging from other vehicle 1 even when the power from power transmitting facility 9 cannot be received contactlessly. Hereinafter, a second charging system 102 according to the embodiment will be described.

Figure 5:
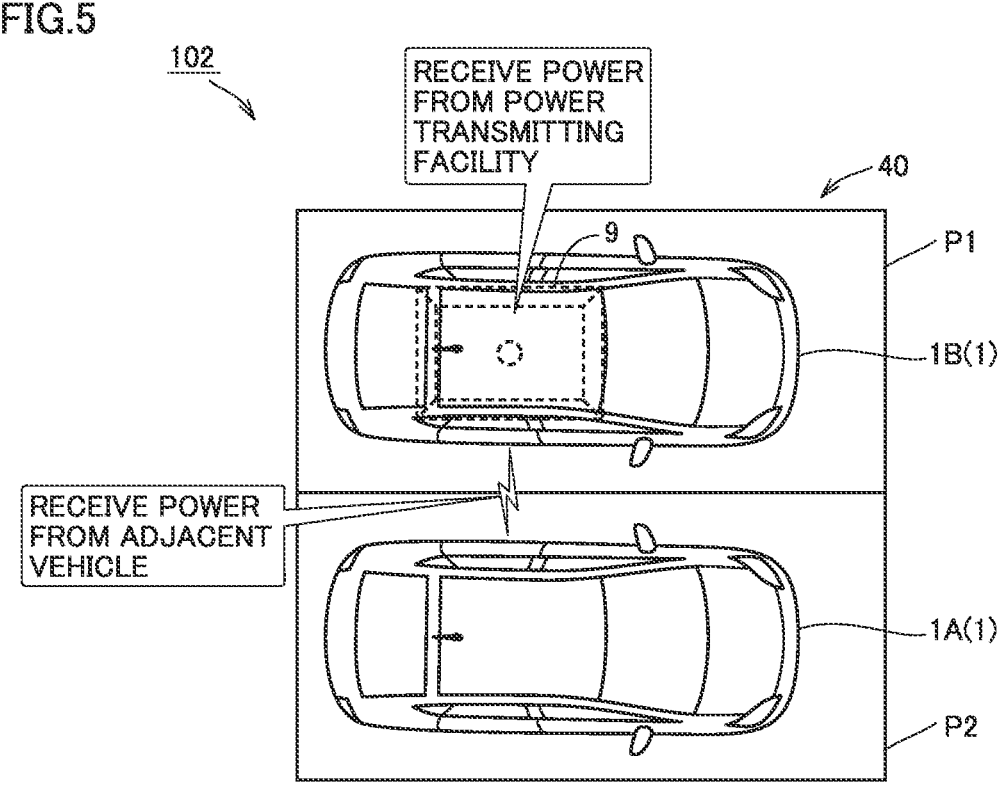
FIG. 5 is a diagram showing an exemplary second charging system according to the embodiment.

FIG. 5 is a diagram showing an exemplary second charging system 102 according to the embodiment. Second charging system 102 includes a vehicle 1A, a vehicle 1B, and a power transmitting facility 9 provided in parking lot 40 and configured to contactlessly transmit power to each of vehicle 1A and vehicle 1B. Vehicle 1A is an example of "first vehicle" Vehicle 1B is an example of "second vehicle".

Vehicle 1B is parked in parking space P1 of parking lot 40. Therefore, while vehicle 1B is parked therein, battery 161 of vehicle 1B can be charged using the power from power transmitting facility 9.

On the other hand, vehicle 1A is parked in parking space P2 provided with no power transmitting facility 9. Therefore, while vehicle 1A is parked therein, battery 161 of vehicle 1A cannot be charged using the power from power transmitting facility 9.

Therefore, when the power from power transmitting facility 9 cannot be received contactlessly, vehicle 1A requests adjacent vehicle 1B to output power. When the power from power transmitting facility 9 can be received contactlessly, vehicle 1B contactlessly outputs, to vehicle 1A, the power received from power transmitting facility 9 in accordance with the request from vehicle 1A.

Specifically, when ECU 11 of vehicle 1A determines that power receiving device 171 cannot receive power from power transmitting facility 9, ECU 11 outputs a request signal for requesting adjacent vehicle 1B to transmit power in accordance with an instruction input by the user of vehicle 1A under conditions that a power transmission request condition is satisfied.

The power transmission request condition includes, for example, a condition that a distance between vehicle 1A and vehicle 1B is less than or equal to a distance in which power can be contactlessly transmitted from vehicle 1B to vehicle 1A. That is, the power transmission request condition includes a condition that the distance between vehicle 1A and vehicle 1B falls within a range in which contactless charging can be performed.

Upon receipt of the request signal from vehicle 1A, vehicle 1B outputs a permission signal for permitting to transmit power to vehicle 1A having made the request in accordance with an instruction input by the user of vehicle 1B under conditions that a power transmission permission condition is satisfied.

The power transmission permission condition includes, for example, a condition that vehicle 1B is contactlessly receiving power from power transmitting facility 9, and/or a condition that the SOC of vehicle 1B on the power transmitting side is larger than the SOC of vehicle 1A on the power receiving side. It should be noted that the power transmission permission condition may include a condition that the SOC of vehicle 1B on the power transmitting side have reached an upper limit value (for example, fully charged).

When vehicle 1A receives the permission signal from vehicle 1B, vehicle 1A performs a power reception starting process for starting to contactlessly receive power from vehicle 1B. Thus, vehicle 1B contactlessly outputs, to vehicle 1A, the power received from power transmitting facility 9 provided in parking lot 40. More specifically, ECU 11 of vehicle 1B indirectly controls power transmitting device 182 via converter 163 so as to contactlessly output, to vehicle 1A, the power received by power receiving device 171 from power transmitting facility 9.

On this occasion, battery 161 of vehicle 1B may be charged using the power received by power receiving device 171 from power transmitting facility 9, and the power stored in battery 161 may be contactlessly output to vehicle 1A. Alternatively, vehicle 1B may contactlessly output the power received by power receiving device 171 to vehicle 1A directly without charging battery 161 using the power received by power receiving device 171 from power transmitting facility 9. Further, vehicle 1B may contactlessly output, to vehicle 1A, power corresponding to an amount of power contactlessly received from power transmitting facility 9 provided in parking lot 40.

Thus, even when vehicle 1A cannot contactlessly receive the power from power transmitting facility 9 provided in parking lot 40, the power output from power transmitting device 182 provided at the side surface portion of vehicle 1B can be received contactlessly by power receiving device 172, and battery 161 can be charged using the received power. Therefore, the user's convenience is improved.

<Process Flow>

Figure 6:
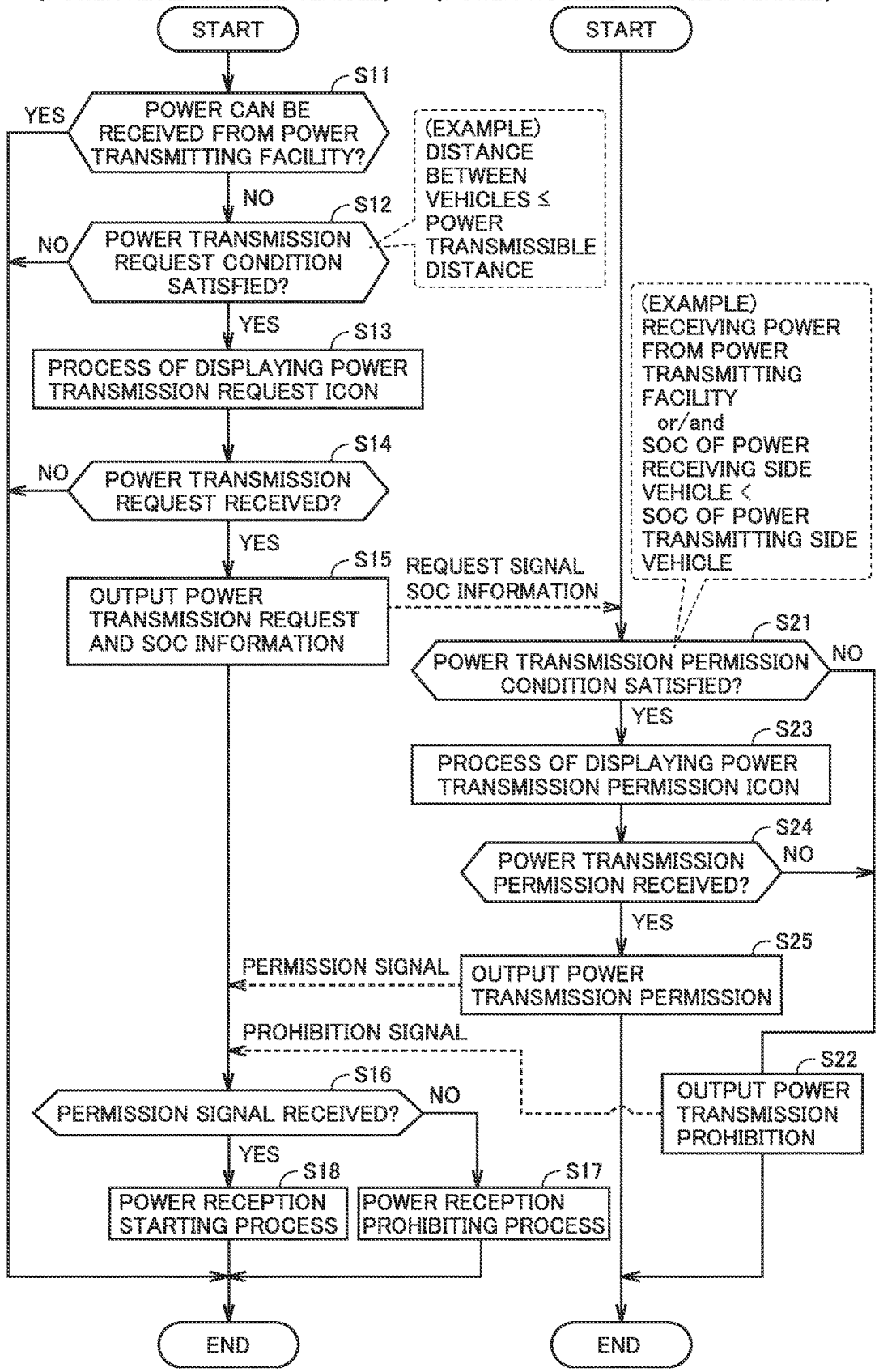
FIG. 6 is a flowchart showing a process procedure of contactless charging between vehicles according to the embodiment.

FIG. 6 is a flowchart showing a process procedure of contactless charging between vehicles according to the embodiment. That is, FIG. 6 shows a procedure of each of the process between vehicle 1A and vehicle 1B in first charging system 101 of FIG. 4 and the process between vehicle 1A and vehicle 1B in second charging system 102 of FIG. 5.

The flowchart of FIG. 6 is invoked from a main routine (not shown) and executed when a predetermined condition is satisfied, for example. In the figure, the process performed by ECU 11 of the power receiving side vehicle is shown on the left side, and the process performed by ECU 11 of the power transmitting side vehicle is shown on the right side.

The power receiving side vehicle corresponds to each of vehicle 1A in first charging system 101 of FIG. 4 and vehicle 1A in second charging system 102 of FIG. 5. The power transmitting side vehicle corresponds to each of vehicle 1B in first charging system 101 of FIG. 4 and vehicle 1B in second charging system 102 of FIG. 5. Each step is implemented by software processing by ECU 11 of each of the power receiving side vehicle and the power transmitting side vehicle, but may be implemented by hardware such as an LSI (Large Scale Integration) disposed in ECU 11. Hereinafter, the term "step" is abbreviated as S.

As shown in FIG. 6, the power receiving side vehicle determines whether or not power can be contactlessly received from power transmitting facility 9 provided at intersection 30 or parking lot 40 (S11). For example, the power receiving side vehicle determines whether or not the power receiving side vehicle is located at a position at which power from power transmitting facility 9 can be received contactlessly. When the power receiving side vehicle can contactlessly receive the power from power transmitting facility 9 (YES in S11), the power receiving side vehicle returns the process to the main routine without performing contactless charging between the vehicles.

On the other hand, when the power receiving side vehicle cannot contactlessly receive the power from power transmitting facility 9 (NO in S11), the power receiving side vehicle determines whether or not the power transmission request condition is satisfied (S12). When the power transmission request condition is not satisfied (NO in S12), the power receiving side vehicle returns the process to the main routine without performing contactless charging between the vehicles.

On the other hand, when the power transmission request condition is satisfied (YES in S12), the power receiving side vehicle performs a process of displaying a power transmission request icon for receiving a power transmission request from the user (S13). For example, ECU 11 of the power receiving side vehicle displays the power transmission request icon on display 132 of navigation system 13. Alternatively, ECU 11 of the power receiving side vehicle transmits an image signal for displaying the power transmission request icon to the users mobile terminal (not shown) such as a smartphone via communication module 14. Thus, the power transmission request icon is displayed on the display of the user's mobile terminal.

The power receiving side vehicle determines whether or not the power transmission request by the user has been received (S14). For example, ECU 11 of the power receiving side vehicle determines whether or not an instruction to make the power transmission request by the user using operation unit 133 to operate the power transmission request icon displayed on display 132 of navigation system 13 has been received from navigation system 13. Alternatively, ECU 11 of the power receiving side vehicle determines whether or not an instruction to make the power transmission request by the user using an operation unit (not shown) of the mobile terminal to operate the power transmission request icon displayed on the display of the mobile terminal has been received from the mobile terminal.

When the power receiving side vehicle has received no power transmission request (NO in S14), the power receiving side vehicle returns the process to the main routine without performing contactless charging between the vehicles. On the other hand, when the power receiving side vehicle has received the power transmission request (YES in S14), the power receiving side vehicle outputs, to the power transmitting side vehicle, a request signal corresponding to the power transmission request and SOC information by which the SOC of battery 161 can be specified (S15).

In response, upon receipt of the power transmission request and the SOC information from the power receiving side vehicle, the power transmitting side vehicle determines whether or not the power transmission permission condition is satisfied (S21). When the power transmission permission condition is not satisfied (NO in S21), the power transmitting side vehicle outputs, to the power receiving side vehicle, a prohibition signal corresponding to power transmission prohibition, and returns the process to the main routine.

On the other hand, when the power transmission permission condition is satisfied (YES in S21), the power transmitting side vehicle performs a process of displaying the power transmission permission icon for receiving a power transmission permission from the user (S23). For example, ECU 11 of the power transmitting side vehicle displays the power transmission permission icon on display 132 of navigation system 13. Alternatively, ECU 11 of the power transmitting side vehicle transmits an image signal for displaying the power transmission permission icon to the user's mobile terminal (not shown) such as a smartphone via communication module 14. Thus, the power transmission permission icon is displayed on the display of the user's mobile terminal.

The power transmitting side vehicle determines whether or not the power transmission permission by the user has been received (S24). For example, ECU 11 of the power transmitting side vehicle determines whether or not an instruction to permit power transmission by the user using operation unit 133 to operate the power transmission permission icon displayed on display 132 of navigation system 13 has been received from navigation system 13. Alternatively, ECU 11 of the power transmitting side vehicle determines whether or not an instruction to permit power transmission by the user using an operation unit (not shown) of the mobile terminal to operate the power transmission permission icon displayed on the display of the mobile terminal has been received from the mobile terminal.

It should be noted that the power transmitting side vehicle may be configured to allow the user to set in advance whether to permit power transmission in response to a power transmission request from a power receiving side vehicle. For example, the user of the power transmitting side vehicle may make a permission for a power transmission request in advance using operation unit 133. In this case, ECU 11 of the power transmitting side vehicle may skip the processes of S23 and S24 and may perform a below-described process of S25.

When the power transmission permission has not been received (NO in S24), the power transmitting side vehicle outputs a prohibition signal corresponding to power transmission prohibition to the power receiving side vehicle, and returns the process to the main routine. On the other hand, when the power transmission permission has been received (YES in S24), the power transmitting side vehicle outputs a permission signal corresponding to power transmission permission to the power receiving side vehicle (S25).

In response, the power receiving side vehicle determines whether or not the permission signal has been received (S16). When no permission signal has been received from the power transmitting side vehicle, i.e., when the prohibition signal has been received from the power transmitting side vehicle (NO in S16), the power receiving side vehicle performs a power reception prohibiting process for prohibiting the power from being contactlessly received from the power transmitting side vehicle (S17), and returns the process to the main routine.

On the other hand, when the permission signal has been received from the power transmitting side vehicle (YES in S16), the power receiving side vehicle performs a power reception starting process for starting to contactlessly receive power from the power transmitting side vehicle (S18), and returns the process to the main routine. Thus, the power transmitting side vehicle contactlessly outputs, to the power receiving side vehicle, the power received by power receiving device 171, after charging battery 161 using the power received by power receiving device 171 from power transmitting facility 9 or without charging battery 161 using the power received by power receiving device 171 from power transmitting facility 9.

It should be noted that the power transmitting side vehicle may stepwisely change the power to be output to the power receiving side vehicle, in accordance with the amount of power contactlessly received from power transmitting facility 9. That is, the power transmitting side vehicle may control power transmitting device 181 via converter 163 so as to contactlessly output, to the power receiving side vehicle, power corresponding to the amount of power contactlessly received from power transmitting facility 9.

As described above, in the present embodiment, when the power receiving side vehicle cannot contactlessly receive power from power transmitting facility 9, the power receiving side vehicle can request the power transmitting side vehicle to contactlessly transmit power. When the power transmission request from the power receiving side vehicle is permitted, the power transmitting side vehicle can contactlessly output, to the power receiving side vehicle, the power from power transmitting facility 9 while contactlessly receiving the power from power transmitting facility 9. Thus, even when the power receiving side vehicle cannot contactlessly receive the power from power transmitting facility 9, battery 161 can be charged using the power from power transmitting facility 9 received via the power transmitting side vehicle. Therefore, the user's convenience is improved.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging system that contactlessly charges a vehicle with power, the charging system comprising:
    a first vehicle that stops to wait for a traffic light at a traveling lane leading to an intersection;
    a second vehicle that stops to wait for the traffic light at the traveling lane; and
    a power transmitting facility that contactlessly transmits power to each of the first vehicle and the second vehicle, the power transmitting facility being provided in the traveling lane, wherein
    when the first vehicle stops at a position at which the power from the power transmitting facility is unable to be contactlessly received and a distance between the first vehicle and the second vehicle is less than or equal to a distance in which power can be contactlessly transmitted from the second vehicle to the first vehicle, the first vehicle requests the second vehicle to output the power in accordance with an instruction input by the user of the first vehicle, when the second vehicle stops at a position at which the power from the power transmitting facility is able to be contactlessly received and a power transmission permission condition is satisfied, the second vehicle contactlessly outputs, to the first vehicle, the power received from the power transmitting facility in accordance with the request from the first vehicle, and the first vehicle contactlessly receives the power from the second vehicle.

2. The charging system according to claim 1, wherein when the first vehicle stops at the position at which the power from the power transmitting facility is unable to be contactlessly received and the distance between the first vehicle and the second vehicle is less than or equal to the distance in which power can be contactlessly transmitted from the second vehicle to the first vehicle, the first vehicle displays an icon for receiving the instruction from the user on a display of a navigation system of the first vehicle or a mobile terminal of the user.

3. The charging system according to claim 2, wherein the power transmission permission condition includes a condition that the second vehicle is contactlessly receiving power from the power transmitting facility, a condition that an amount of power stored in the second vehicle is larger than an amount of power stored in the first vehicle, a condition that the amount of power stored in the second vehicle have reached an upper limit value or a condition that time of waiting for the traffic light at the intersection is more than or equal to a threshold value.

4. The charging system according to claim 2, wherein the second vehicle contactlessly outputs the power from the power transmitting facility to the first vehicle while charging a battery using the power from the power transmitting facility.

5. The charging system according to claim 2, wherein the second vehicle charges a battery using the power from the power transmitting facility, and contactlessly outputs the power stored in the battery to the first vehicle.

6. The charging system according to claim 2, wherein the second vehicle contactlessly outputs the power from the power transmitting facility to the first vehicle without charging a battery using the power from the power transmitting facility.

* * * * *